(12) United States Patent
Hill et al.

(10) Patent No.: US 9,740,838 B2
(45) Date of Patent: Aug. 22, 2017

(54) METHOD AND COMPUTER PROGRAM FOR PROVIDING AUTHENTICATION TO CONTROL ACCESS TO A COMPUTER SYSTEM

(75) Inventors: Michael J. Hill, Milwaukee, WI (US); Thomas R. Ruddy, Fort Lauderdale, FL (US)

(73) Assignee: Sensipass Ltd., Dublin (IE)

( * ) Notice: Subject to any disclaimer, the term of this patent is extended or adjusted under 35 U.S.C. 154(b) by 159 days.

(21) Appl. No.: 14/123,594

(22) PCT Filed: Jun. 1, 2012

(86) PCT No.: PCT/IB2012/001073
§ 371 (c)(1),
(2), (4) Date: Feb. 18, 2014

(87) PCT Pub. No.: WO2012/164385
PCT Pub. Date: Dec. 6, 2012

(65) Prior Publication Data
US 2014/0196119 A1    Jul. 10, 2014

(30) Foreign Application Priority Data

Jun. 3, 2011   (GB) .................................. 1109311.9
Sep. 5, 2011   (GB) .................................. 1115292.3

(51) Int. Cl.
*G06F 21/36* (2013.01)
*G06F 21/30* (2013.01)
(Continued)

(52) U.S. Cl.
CPC .............. *G06F 21/30* (2013.01); *G06F 21/32* (2013.01); *G06F 21/36* (2013.01); *G06F 21/40* (2013.01);
(Continued)

(58) Field of Classification Search
CPC   H04L 63/0861; H04L 2463/082; G06F 21/32
See application file for complete search history.

(56) References Cited

U.S. PATENT DOCUMENTS 7,630,524 B2   12/2009   Lauper et al.
2001/0047488 A1   11/2001   Verplaetse et al.
(Continued)

FOREIGN PATENT DOCUMENTS

CN   1430417   7/2003
CN   101908140   12/2010
(Continued)

OTHER PUBLICATIONS

Actual translation of KR 20050053396 A.*
(Continued)

*Primary Examiner* — Farid Homayounmehr
*Assistant Examiner* — Zhimei Zhu
(74) *Attorney, Agent, or Firm* — Boyle Fredrickson, S.C.

(57) ABSTRACT

The present invention relates to a method and computer program for providing authentication to control access to a computer. system including online services accessed via a portal, cloud based systems and browser accessed systems using for example HTML5, and relates particularly, but not exclusively, to authentication systems for mobile computer and telecommunications devices.

21 Claims, 7 Drawing Sheets

(51) Int. Cl.
*G06F 21/40* (2013.01)
*G06F 21/32* (2013.01)

(52) U.S. Cl.
CPC ............... *G06F 2221/2103* (2013.01); *G06F 2221/2111* (2013.01)

(56) References Cited

U.S. PATENT DOCUMENTS

| | | | |
|---|---|---|---|
| 2003/0103653 A1* | 6/2003 | Avni | G06F 21/32 382/119 |
| 2003/0136837 A1 | 7/2003 | Amon et al. | |
| 2006/0064392 A1* | 3/2006 | Glisson | G06Q 10/10 705/75 |
| 2007/0112775 A1* | 5/2007 | Ackerman | G06F 21/32 |
| 2008/0136678 A1 | 6/2008 | Harrington | |
| 2008/0137916 A1 | 6/2008 | Lauper et al. | |
| 2008/0175443 A1 | 7/2008 | Kahn et al. | |
| 2009/0094690 A1 | 4/2009 | Hayashi | |
| 2009/0102603 A1 | 4/2009 | Fein et al. | |
| 2010/0095371 A1 | 4/2010 | Rubin | |
| 2010/0158327 A1 | 6/2010 | Kangas et al. | |
| 2010/0192209 A1 | 7/2010 | Steeves et al. | |
| 2010/0205667 A1* | 8/2010 | Anderson | G06F 3/013 726/19 |
| 2011/0032074 A1* | 2/2011 | Novack | G06F 21/32 340/5.53 |
| 2011/0070864 A1* | 3/2011 | Karam | G06F 21/34 455/411 |
| 2012/0054842 A1* | 3/2012 | Urios Rodriguez | G06F 21/32 726/6 |
| 2012/0254989 A1* | 10/2012 | Levien | G06F 3/011 726/19 |

FOREIGN PATENT DOCUMENTS

| | | | |
|---|---|---|---|
| EP | 1422589 | | 5/2004 |
| EP | 2000939 | | 12/2008 |
| GB | 2466548 | | 6/2010 |
| KR | 20050053396 A | * | 6/2005 |
| WO | 2008124708 | | 10/2008 |

OTHER PUBLICATIONS

GB1115292.3, European Search Report dated Sep. 9, 2014, 6 pages.
GB1115292.3, European Search and Examination Report dated Jun. 3, 2013, Sep. 9, 2014, 8 pages.
EP12793136.8, Supplementary European Search Report dated May 4, 2015, 17 pages.
Avimir, "Security White Paper", http://avimir.com/Media/Avimir-Security-WhitePaper_4Mar2012.pdf, dated Jan. 7, 2011.
CN 201280037478.0, First Office Action and Search Report dated Mar. 25, 2016, 8 pages, and English Translation, 6 pages.
JP 2014-513266, Office Action dated Jul. 7, 2016, 4 pages, and English Translation, 4 pages.
CN Serial No. 201280037478.0, Office Action dated Feb. 6, 2017, 7 pages, and English Translation, 6 pages.

* cited by examiner

METHOD AND COMPUTER PROGRAM FOR PROVIDING AUTHENTICATION TO CONTROL ACCESS TO A COMPUTER SYSTEM

The present invention relates to a method and computer program for providing authentication to control access to a computer system including online services accessed via a portal, cloud based systems and browser accessed systems using for example HTML5, and relates particularly, but not exclusively, to authentication systems for mobile computer and telecommunications devices.

The use of authentication systems to control access to computer systems is well known. The most regularly used systems are alphanumeric passwords that are typed into a computer device to identify and authenticate a user and permit or deny access to a computer system. The use of such passwords has the disadvantage that they are subject to security weaknesses, including "key logging", where key presses on a keyboard are monitored and the entering of passwords identified and "shoulder surfing" where a person looking over the shoulder of a computer user watches the password that is entered. Such alphanumeric password systems can also create difficulties for users where different keyboard layouts are standard in different countries. Other known authentication systems include those that only utilise on screen imagery, avoiding a user's need to press keys. However, such systems can still be vulnerable to shoulder surfers. Such systems are particularly vulnerable to shoulder surfing when applied to mobile computing and telecommunication devices. In an example of such a system, a user includes photographs of people they know into a series of stock photographs of people they don't know. A group of these photographs is displayed on screen and the user identifies the person they know from the people they do not know. However, the system has the disadvantage that the user's photographs can be obviously different from the stock photographs making it straight forward in some cases to identify the non-stock photograph.

It is well known to create authentication systems where a series of authentication steps must be undertaken. However, each step is time consuming that can create frustration in a user.

It is also the case that many access control systems are unsuitable for, or difficult to use for, people who are visually impaired. In particular touch-screen devices are difficult to use.

Biometric control systems require the presence of a biometric reader which is specifically programmed for an individual user and is only applicable for the programmed device which does not allow user access via remote or secondary access points.

It is also the case that in mobile computing and telecommunication devices, access to users of these devices can often be controlled by telecommunication companies thereby making it difficult for advertisers to access potential customers. Furthermore, audio, and particularly video, advertising can be easily ignored and this is particularly the case on mobile computing and telecommunication devices which are by their very nature small and therefore must attract the attention of the user unlike, for example, television and cinema advertising which is difficult to ignore.

Preferred embodiments of the present invention seek to overcome the above disadvantages of the prior art.

According to an aspect of the present invention, there is provided a method of providing authentication to control access to a computer system comprising the steps:

receiving at least one first input from at least one measuring device formed as part of a mobile computing and/or communication device;

comparing said first input to a previously measured and recorded, input; and if said first input is equivalent to said previously measured and recorded input, subject to predetermined error factors, access to a first computer system is permitted.

By providing an authentication method for a mobile device that utilises an input from a measuring device and compares that input to a previously measured and recorded input, the advantage is provided that the authentication method is quite different from those of the prior art thereby overcoming problems of the prior art. In particular, this method makes it particularly difficult for people trying to gain unauthorised access to the computer system to identify the key steps in the authentication process. In particular, shoulder surfing, a particular problem for mobile computing devices, becomes extremely difficult because in many circumstances it is not clear to anyone other than the authorised user of the mobile device that an authentication step is being undertaken. Furthermore, the use of non-alphanumeric pass codes is easier for user to remember and is particularly import for users suffering with dyslexia who struggle to remember alphanumeric.

The method may further comprise creating an output on said mobile device, said output comprising displaying, on a display portion of said mobile device, a series of dynamic images and/or playing, through an audio output portion of said mobile device, a series of sounds;

at a moment in time during said output making at least one second input; and if said second input occurs substantially at a time equivalent to a predetermined time in said output, access to a second computer system is permitted.

By using a series of dynamic images or sounds and having a moment in time as an authentication step, the advantage is provided that in combination with a measured input and both authentications running on a mobile device, security is significantly improved. It is particularly difficult for a third party attempting to identify the authentication method used to shoulder surf since the combination of the two separate authentication steps can be very difficult to observe from a third party point of view. Furthermore, the two authentication steps can be undertaken very quickly with start if one step also acting at the ending point of the other step. For example, a video file can be used in the first authentication step and the authorisation is allowed depending on the time of the interruption. If the interrupting act can be the second authentication step then the total time required to complete the authentication steps is not that great compared to the increased security of two authentication steps. It is also the case that shoulder surfing two such steps that happen in such quick succession is very difficult, further enhancing the security provided.

In a preferred embodiment the first input comprises an input taken from the environment in which the mobile device is located.

By taking the input from the environment in which the mobile device is located provides the advantage that it further complicates the authentication for unauthorised third parties trying to access a computer system using a mobile device. Further examples of the environmental factors are set out below together with examples of the advantages that they provide.

In a preferred embodiment the first input comprises measurements taken by at least one accelerometer and/or gyroscope relating to the movement of the mobile device in a predetermined manner.

By using measurements taken from an accelerometer, gyroscope or magnetic orientation device, the advantage is provided that the movement or positioning of the mobile device or access point can be recorded allowing a series of movements that, like a signature, are easy for the person who originally recorded them to reproduce but are difficult for anyone else to reproduce.

In a preferred embodiment the first input comprises measurements taken by at least one accelerometer and/or gyroscope relating to the holding of the mobile device in a predetermined orientation.

In another preferred embodiment the first input comprises measurements taken by a light measuring device relating to at least one colour.

In a further preferred embodiment the first input comprises a series of colours.

The use of colour, in particular a series of colours, provides the advantage that an imaging device or camera, present on many mobile computing and telecommunication devices, can be used as part of the authentication process. Because it is necessary to move the mobile device or colour substrate around in order to identify the sequence of colours, it is difficult for an unauthorised person to identify at what point colours are being selected and at what point the phone or colour substrate is simply being moved from or between one colour and the next.

In another preferred embodiment the first input comprises measurements taken by a light measuring device relating to at least one movement detected by said light measuring device.

Movement of a person in front of a camera is somewhat like movement of a mobile device containing an accelerometer in that the movement is easy to consistently reproduce for a person after the first recording but is difficult for a third party to reproduce in the same way.

In another preferred embodiment the computer system comprises software and/or hardware.

According to another aspect of the present invention, a computer program for providing authentication to control access to a computer system comprising:
first computer code receiving at least one first input from at least one measuring device formed as part of a mobile computing and/or communication device;
second computer code for comparing said first input to a previously measured and recorded input; and
third computer code for determining if said first input is equivalent to said previously measured and recorded input, subject to predetermined error factors, permitting access to a first computer system.

According to a further aspect of the present invention, a computer program product for providing authentication to control access to a computer system, the product comprising a computer readable memory and a computer program comprising:
first computer code receiving at least one first input from at least one measuring device formed as part of a mobile computing and/or communication device;
second computer code for comparing said first input to a previously measured and recorded input; and
third computer code for determining if said first input is equivalent to said previously measured and recorded input, subject to predetermined error factors, permitting access to a first computer system.

According to an aspect of the present invention, there is provided method of providing authentication to control access to a computer system comprising the steps:
creating an output on computing device, said output comprising displaying, on a display portion of said computing device, a series of dynamic images and/or playing, through an audio output portion of said computing device, a series of sounds, said output further comprising an advertisement;
at a moment in time during said output making at least one input; and
if said input occurs substantially at a time equivalent to a predetermined time in said output, access to said computer system is permitted.

By using an advertisement provides the advantage that the user of the computer device is obliged to be forced to watch or listen to the advertisement. In many other situations, advertisers cannot guarantee that users will watch the advertisement and cannot be sure that the advertisement has been watched. In the present invention, the input indicates that the advertisement was watched. This in turn leads to further potential advantages including rewarding a user for watching an advertisement and improve targeting of advertising while employing the advertisement as an authentication tool.

In a preferred embodiment the computing device comprises a mobile computing and/or communication device.

By using a mobile computing or telecommunication device as a computing device, the advantage is provided that advertisers can gain direct access to customers via the mobile devices. It is commonplace, in particular for mobile telephones, to have the advertising display on them controlled by the mobile phone operating companies. As a result, advertisers struggle to gain a direct connection to potential customers in particular where feedback from the customer, for example, which advertisements are viewed, is available. Furthermore, due to the size of the screen on a mobile computing device, it is easy for a user to ignore an advertisement that is being displayed.

In a preferred embodiment the output comprises a series of dynamic images and a series of sounds and said dynamic images are not matched with said sounds and said predetermined moment in time is determined on one of said series of dynamic images or said series of sounds.

Where a series of sounds and a series of dynamic images are used at the same time but the timing of the authentication step is taken from one only, the advantage is provided that the parties attempting to identify the authentication step cannot tell which of the images or sounds is being used. This is particularly useful for mobile computing devices where images are often used and headphones worn, making it extremely difficult for a shoulder surfer to identify the authentication step.

In a preferred embodiment the series of dynamic images is a video.

In another preferred embodiment series of sounds is an audio track.

In a further preferred embodiment a user of said computer device is rewarded for using said authentication method.

By rewarding a person for using an advertisement as part of their authentication process provides the advantage that the advertiser can ensure that potential customers are viewing their advertisements and confirm that a viewing has taken place.

In a further preferred embodiment the user authorises information about computer systems the use of said authentication method provides access to be fed back to a third party.

By feeding back information about the sites where a user goes upon using the authentication method, an advertiser is able to build up a profile relating to that user and target advertising most effectively.

According another aspect of the present invention, there is provided a computer program for providing authentication to control access to a computer system comprising:
first computer code for creating an output on computing device, said output comprising displaying, on a display portion of said computing device, a series of dynamic images and/or playing, through an audio output portion of said computing device, a series of sounds, said output further comprising an advertisement;
second computer code for at a moment in time during said output making at least one input; and
third (see comments above) computer for determining if said input occurs substantially at a time equivalent to a predetermined time in said output, permitting access to said computer system.

According to a further aspect of the present invention, there is provided a computer program product for providing authentication to control access to a computer system, the product comprising a computer readable memory and a computer program comprising:
first computer code for creating an output on computing device, said output comprising displaying, on a display portion of said computing device, a series of dynamic images and/or playing, through an audio output portion of said computing device, a series of sounds, said output further comprising an advertisement;
second computer code for at a moment in time during said output making at least one input; and
third (see comments above) computer for determining if said input occurs substantially at a time equivalent to a predetermined time in said output, permitting access to said computer system.

According another aspect of the present invention, there is provided a method of providing authentication to control access, comprising the steps:
creating an output on said mobile device, said output comprising displaying, on a display portion of said mobile device, a series of dynamic images and/or playing, through an audio output portion of said mobile device, a series of sounds
receiving at least one input from at least one measuring device;
comparing said input to a previously measured and recorded input; and
if said first input is equivalent to said previously measured and recorded input, subject to predetermined error factors, and said input occurs substantially at a time equivalent to a predetermined time in said output, access is permitted.

According to a further aspect of the present invention, there is provided computer program for providing authentication to control access, the program comprising:
first computer code for creating an output on said mobile device, said output comprising displaying, on a display portion of said mobile device, a series of dynamic images and/or playing, through an audio output portion of said mobile device, a series of sounds
second computer code for receiving at least one input from at least one measuring device;
third computer code for comparing said input to a previously measured and recorded input; and
fourth computer code for determining if said first input is equivalent to said previously measured and recorded input, subject to predetermined error factors, and said input occurs substantially at a time equivalent to a predetermined time in said output, permitting access.

According to a further aspect of the present invention there is provided an authentication method for entry control comprising the steps of:
using at least one data capture device to capture first data relating to at least one object located adjacent said device;
testing said first data against at least one first standard to determine a first match;
converting said first data into at least one first image and displaying said at least one image on a display device;
recording second data relating to a user interaction with said image;
testing said second data against at least one second standard to determine a second match; and
allowing or denying access on the basis of said first and second matches.

By providing an authentication method involving the steps set out above provides the advantage of improving the security in authentication methods. In particular, the authentication method includes two linked steps. These steps include the first step which requires the user to have an authentication key, for example an image that can be recognised or a biometric of the user that can be measured. The next step requires something that the user knows, for example what part of the image that was created in step one, must be traced over to produce the second data. As a result, obtaining the key is not sufficient to complete the authentication process and similarly knowing the interaction that is required will not complete the authentication. In a system where multiple users can obtain access using their own authentication, obtaining one person's key and another person's knowledge will not, in the present invention, allow access to the system since the two authentication steps are linked to each other.

Furthermore, the linkage between the two steps acts as a prompt for the user without compromising security. For example, in a system of the prior art combining a biometric scan such as face recognition with an alpha numeric code entry, a user is prompted to the facial scan and the alpha numeric code requiring them to remember the code that is associated with the facial recognition step. In the method of the present invention, the image of the users face prompts them to, for example, trace a shape over a predetermined portion of the face. As a result, the user is prompted for the second step with the assistance of the first step. This makes it much easier for user to remember multiple authentication combination for multiple systems. This decreases the likelihood of a user using the same password for multiple systems, since a different, for example, biometric, can be used as the first authentication step with the resultant image associated with that biometric prompting the user to enter the second step.

In a preferred embodiment the data capture device is a biometric scanner and said object is at least a part of a body.

In another preferred embodiment the data capture device is an electromagnetic wave recording device.

In a further preferred embodiment the electromagnetic wave recording device comprises a camera.

In a preferred embodiment the first data is converted into a first video image.

In another preferred embodiment the second data comprises a second image traced on said display device.

In a further preferred embodiment the display device is a touch screen device and said second image is trace on said display device by touching said touch screen device.

By tracing a second image on a display device, in particular using a touch screen device, to produce the second data, the advantage is provided that the second authentication step can be very quick in particular since the user can anticipate the image that is to be displayed making it easy for them to recall the second authentication step.

In another preferred embodiment the second image is traced on said display device using a pointing device.

In a preferred embodiment the second data comprises a gesture made in front of a camera.

In another preferred embodiment the data capture and testing takes place on a first device that transmits data including data identifying itself to a second device that allows access.

According to another aspect of the present invention there is provided a computer program to provide entry control comprising:

first computer code for using at least one data capture device to capture first data relating to at least one object located adjacent said device;

second computer code for testing said first data against at least one first standard to determine a first match;

third computer code for converting said first data into at least one first image and displaying said at least one image on a display device;

fourth computer code for recording second data relating to a user interaction with said image;

fifth computer code for testing said second data against at least one second standard to determine a second match; and sixth computer code for allowing or denying access on the basis of said first and second matches.

In a preferred embodiment the first computer code controls a biometric scanner and said object is at least a part of a body.

In another preferred embodiment the first computer code controls an electromagnetic wave recording device.

In a further preferred embodiment the electromagnetic wave recording device comprises a camera.

In a preferred embodiment the third computer code converts said first data into a first video image.

In another further preferred embodiment the second data comprises a second image traced on said display device.

In a further preferred embodiment the display device is a touch screen device and said second image is trace on said display device by touching said touch screen device.

In a preferred embodiment the second image is traced on said display device using a pointing device.

In another preferred embodiment the second data comprises a gesture made in front of a camera.

In a further preferred embodiment the data capture and testing takes place on a first device that transmits data including data identifying itself to a second device that allows access.

Preferred embodiments of the present invention will now be described, by way of example only, and not in any limitative sense, with reference to the accompanying drawings in which.

Figure 2:
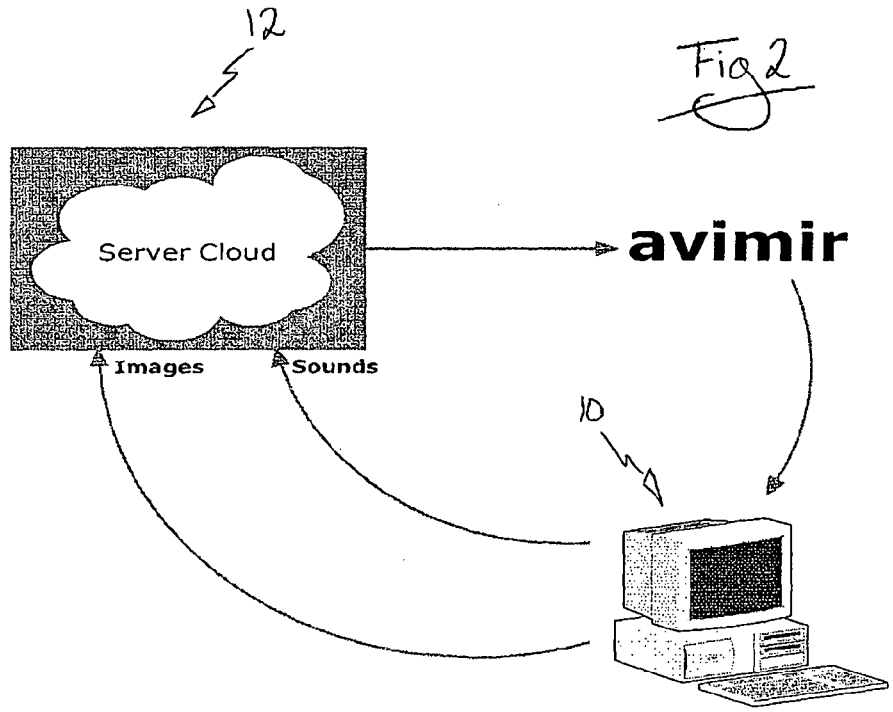
FIG. 2 is a schematic representation of the apparatus used to utilise the method set out in FIG. 1.

Referring to FIG. 2, a method of providing authentication to control access to a computer system including online services accessed via a portal, cloud based systems and browser accessed systems using for example HTML5, utilises computer device 10. This device 10 can be a standard computer device such as a personal computer, a laptop computer or notepad computer. The device 10 can alternatively be a portable computing device such as a tablet computer or other handheld computing device or may indeed be a mobile telecommunication device such as a mobile telephone. The computer device 10 is in communication with further computing devices 12 in the form of a server, a server cloud, or a network of computers such as the Internet.

Figure 1:
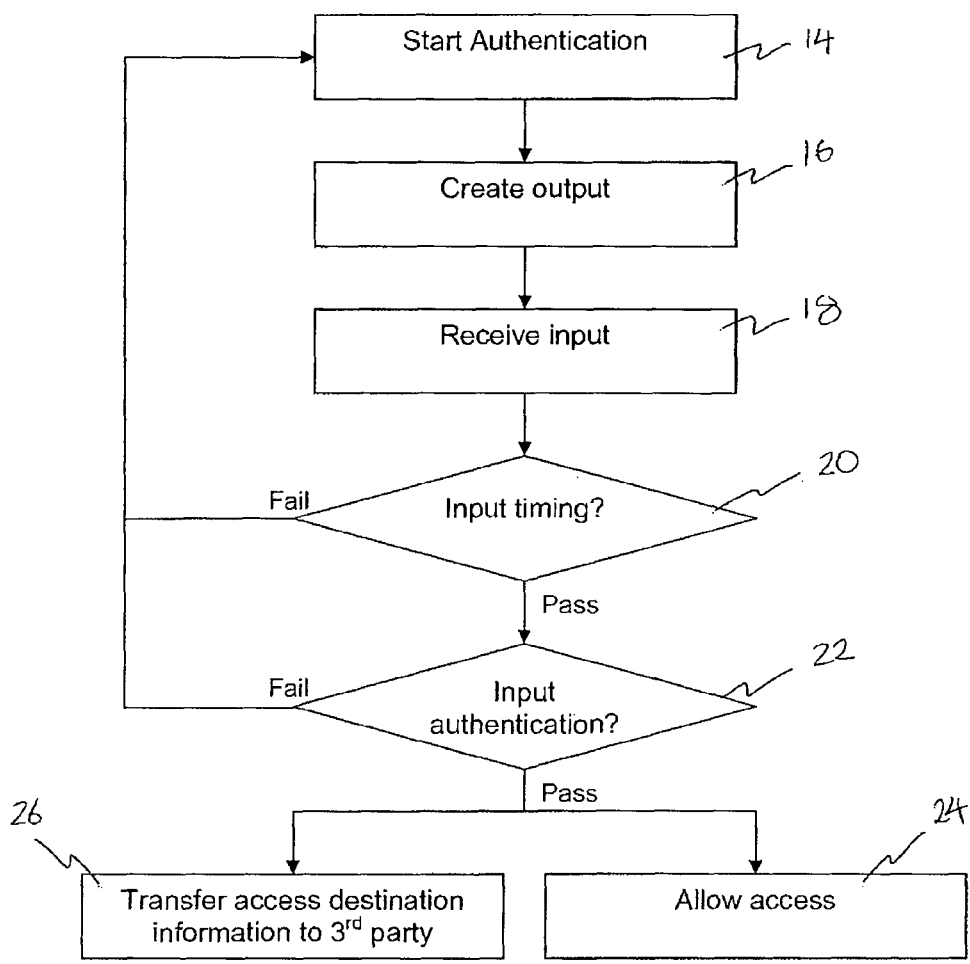
FIG. 1 is a flow chart showing the steps undertaken in the execution and the method of the present invention.

Referring to FIG. 1, a method of providing authentication to control access to a computer system starts at step 14. It should be noted that the computer system that the authentication method controls access to can be computer software, can be computer hardware and can be a combination of hardware and software, the software or hardware can be a single device or can be more than one device that is connecting to another device via a network including online services provided over the internet, including protecting access to a webpage or email system. At step 16, an output is created and output using the computer device. The output may be created on computer device 10 or may be created on server 12 and transferred to computer device 10 for display. The output may be in the form of a series of dynamic images that are displayed consecutively on the display device, for example a screen, forming part of computing device 10. The output may also, or alternatively, be a series of sounds that are output through an audio output portion, for example a speaker or headphones, of or connected to computer device 10. More typically, the series of dynamic images is a video and the series of sounds is an audio track, preferably both video and audio are used with one being randomly selected from a list of clips known the user and the other randomly selected from a library making very difficult for non-authorised users to know which is being used in the authentication step. At step 18, an input is made to the computer device 10 by the user of that device. The timing of the input is tested at step 20. If the timing of the input occurs substantially at a time equivalent to a predetermined time in said output access to the computer system is permitted. If the timing is not substantially equivalent to a predetermined time in the output, the authentication fails and the authentication process restarts at step 14.

The input to the computer device 10 may be in one of many forms. At its most simple, the input may be a single press of a key, a click of a mouse, or touch of the screen. For these inputs, a further authentication step is generally required to provide the required level of security.

However, the input may alternatively be a measurement taken using the computing device. This is particularly the case for a mobile computing device that may contain various measuring devices such as accelerometers, gyroscope, magnetic orientation measuring devices, GPS location measuring devices, audio measuring devices and light measuring devices including cameras, spectrometers or photometers. Other measuring devices are also envisaged to be used as part of the present invention. The input from the measuring device is compared to the previously measured and recorded input subject to predetermined error factors, a comparison made if the input is equivalent to that previously measured and recorded, determined at step 22. If the input from the measuring device is sufficiently equivalent to the previously measured and recorded input, the input authentication passes and access is allowed to the computer system or online service at step 24. However, if the input authentication is not successful, the authentication restarts at step 14.

It should be noted that this input may be a second input after the first timing input that is tested at step 20 or may indeed be the same input, the timing of which is tested at step 20 and the authentication of which is tested at step 22. The output is most preferably a video output in the form of an advertisement. The advertisement may be accompanied by an audio track and this audio track may match the video, for example, as part of the advertisement. However, the audio track may be different (e.g., audio selected from a second advertised product/service) and therefore the timing step can relate to either the predetermined moment in the video or the predetermined moment in the audio track. This can be achieved by providing video and audio tracks from a known selection that the user can easily identify as those that form part of their authentication process. Other random video and audio tracks may also be played. As a result, it will be apparent to the user whether they are making their timed input on the video or audio track. However, to a casual observer it is not apparent which is being used.

Where an advertisement is used as the output, information about the destination to which the authentication process allowed access can be fed back to the third party in order to build up a profile of the person undertaking authentication steps. This can allow an advertiser to direct suitable advertisements to a person.

As an incentive to encourage users to accept advertisements as the output as part of the authentication process, a reward system can be instigated. This can be a direct monetary reward for each advertisement viewed. Alternatively, this can be in the form of points which can be used to make purchases or provide discounts or be transferred to other users within an online marketplace structure.

Figure 3:
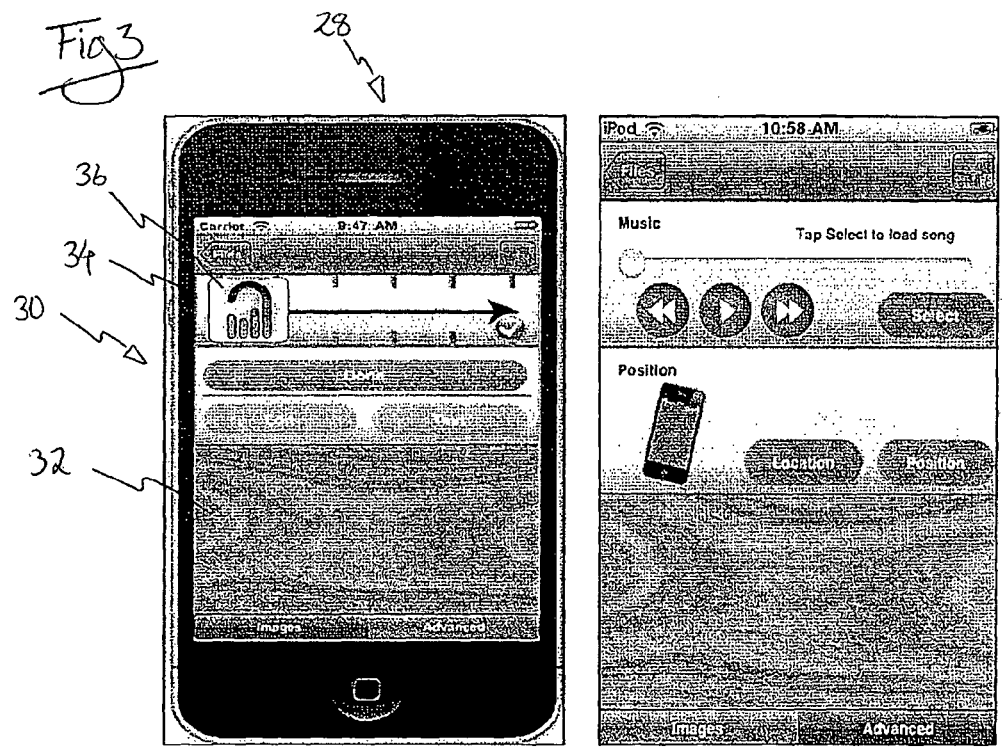
FIGS. 3, 4 and 5 are examples of screen displays used in the method of the present invention.
Figure 4:
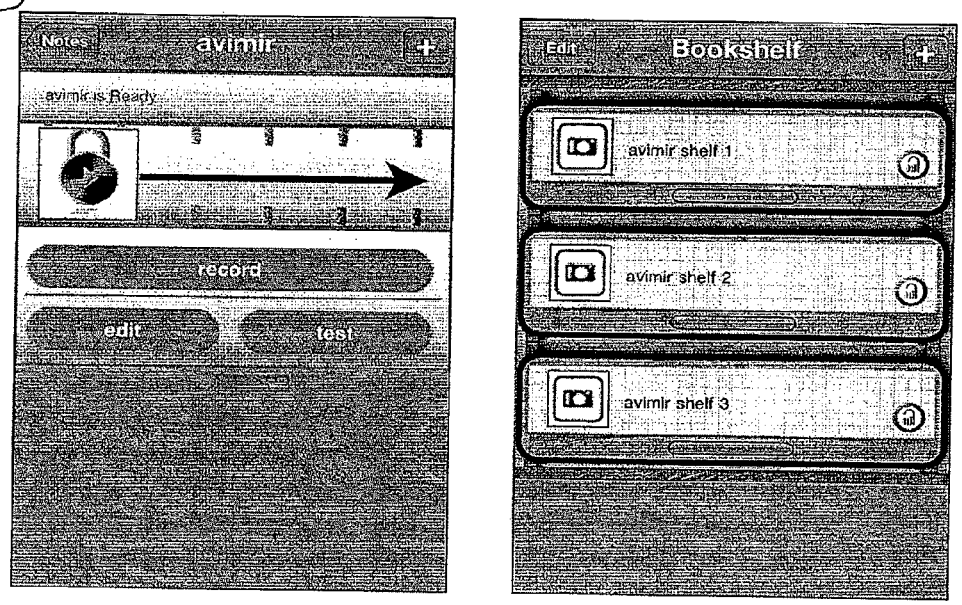
Figure 5:
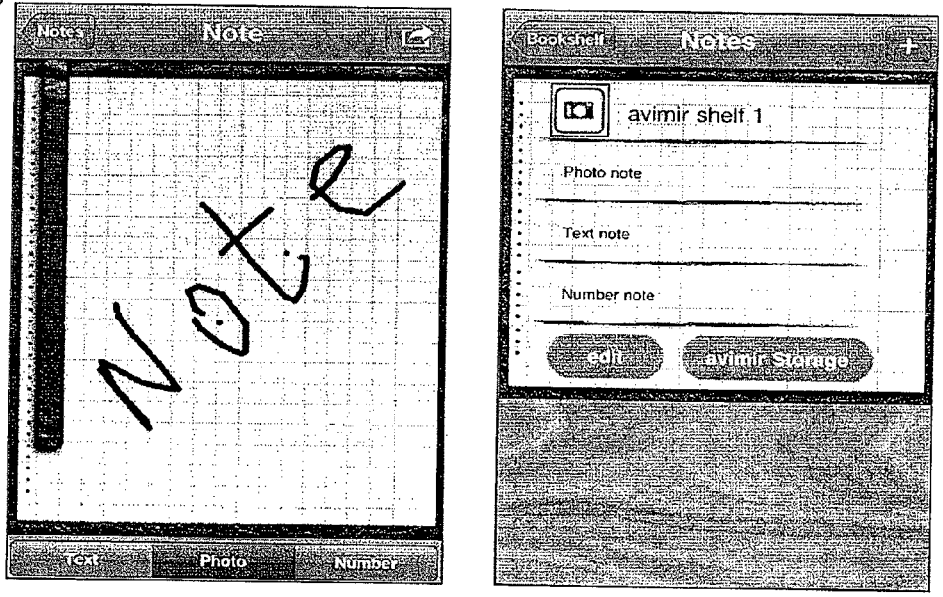
Figure 6:
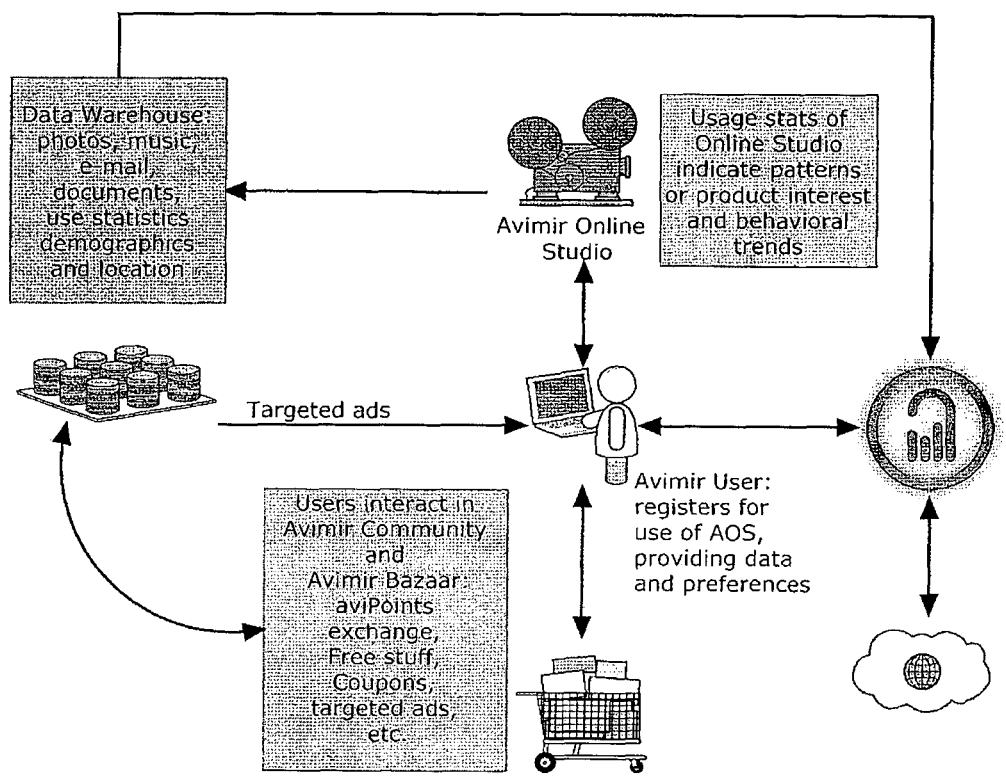
FIG. 6 is a schematic representation of the method of the present invention.

A further example of one of the inputs received at step 18 is shown in FIG. 3, in which a mobile computing device 28 has a touch screen 30. The screen is divided into two portions including a display portion 32 in which a video output is displayed and an input portion 34. As one example, the input portion 34 includes a slider member 36 that can be slid across the screen. When a user touches the slider portion 36 and moves their finger from right to left, the icon shown as slider member 36 appears to move across the screen. The input relating to this operation is recorded as the rhythm of the sliding. In other words, the slider member is moved backwards and forwards from right to left and back again in a predetermined and pre-recorded pattern as decided by the user. In order to create correct input during the input authentication step 22, the rhythm of the sliding motion previously recorded must be reproduced. The combination of authentication inputs, that is the timing of interruption to start reproducing the rhythm of the slider movement provides a very high level of authentication security.

Further examples of the input authentication step are listed below. The input authentication step could be a time and pointing based interaction with a video clip using a pointing device to point at a predetermined part of an image on screen at a predetermined time. The input authentication step could also be replicating a predetermined motion in front of a camera or in a system. The input authentication step could further be inputting a predetermined sequence of audio inputs such as a pitch or voice characteristic. The input authentication step could be only allowing authentication when the device is inside or alternatively outside, a predetermined GPS-determined zone or area. The input authentication step could be performing a predetermined action at a specific time relative to sounds played to the user including 3-dimensional placement of sounds played to a user preferably through headphones. The user can authenticate themselves by interacting with the sound patterns, such 3-dimensional sounds being of particular use to visually impaired users. The input authentication step could be performing a predetermined action using when a specific colour or sequence of colours is displayed on the device. The input authentication step could be performing a predetermined action in response to a predetermined vibration or series of vibrations. The input authentication step could also be tapping on the touch screen at a predetermined time and position where the device recognizes a resonance or timbre signature. The input authentication step could further be vibration at any frequency including LF, RFID, NFC, or digitized biological signature.

Figure 7:
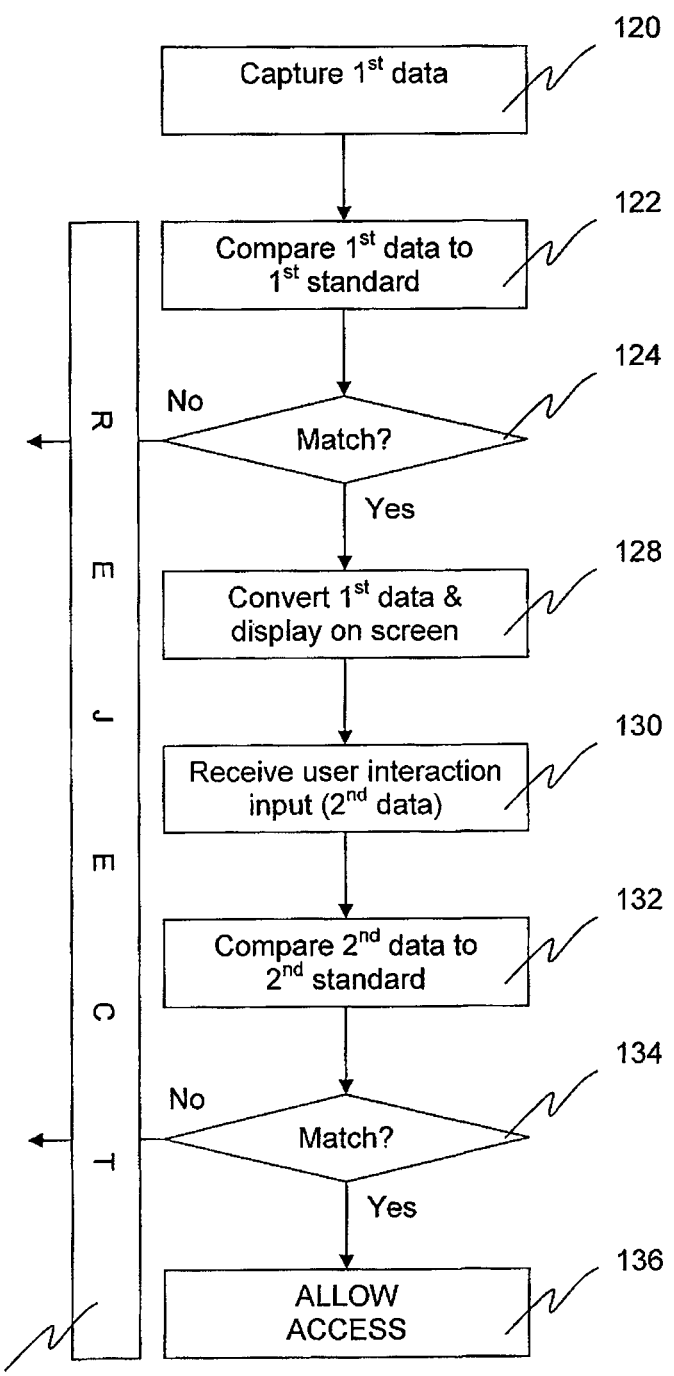
FIG. 7 is a schematic representation of the apparatus used in a method of the present invention.

Referring to FIG. 7, a data capture device, for example digital camera 100 is connected to a data processing device 102 that is in turn connected to a display device 104. The camera 100, processor 102 and display device 104 may be separately housed components connected by wired or wireless means to operate in conjunction with each other. Alternatively, these items may be formed as a single device as part of, for example, a mobile telephone or other communication device, labelled 106. The display device 104 includes a second data capture device, in the form of touch sensitive screen 108 which feeds data back to data processor 102.

Figure 8:
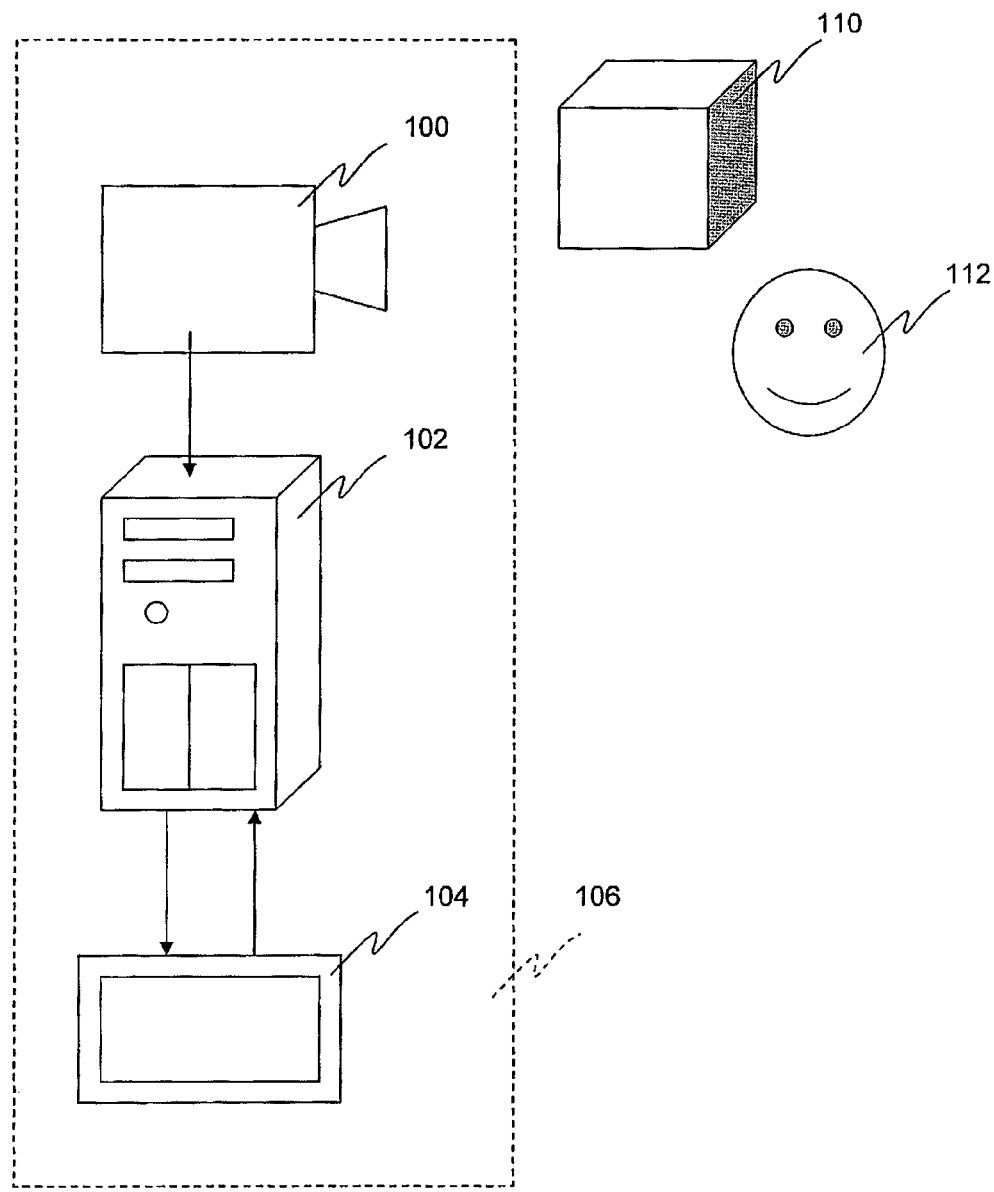
FIG. 8 is a flow chart showing the steps undertaken in the authentication method of the present invention.

Referring also to FIG. 8, camera 100 captures data relating to an object 110 or 112 that is located adjacent camera 100 (step 120). This first data is transferred to data processor 102 and compared to a first standard (step 122) to determine whether there is a match. This comparison of the first data, which is in the first instance image data, with a standard image utilises known image comparison techniques. The techniques used, which are familiar to those skilled in the art, depend on the type of object 110 or 112 in question. The schematic representation of an object at 110 represents an object that acts as a key as a result of its shape or surface decoration. The article represented at 112 represents a body part of a user that similarly acts as a key by measuring a biometric variable of that body part, for example a face utilising face recognition software in comparison step 122.

At step 124, it is determined whether there is a match between the first data captured by device 100 and the first standard data as determined in the comparison step 122. If no match is found, the authentication is rejected at step 126 and any further access to the system that the authentication process is protecting is prevented. However, if a match is found further authentication steps are undertaken including step 128 in which the first data is converted into image data and displayed on screen 104. This conversion of first data at step 128 may be simply the conversion of the first data into image data to be displayed on screen 104, for example where camera 100 is a visible light camera the displayed image may be simply that captured by the camera. Alternative embodiments of the invention where further data processing takes place are set out below.

The display of the image on screen 104 prompts the user to interact with the image thereby inputting second data at step 130. In this example, the interaction uses the touch screen input 108 to trace a shape over a portion of the image displayed on display device 104. For example, if the captured image is of the users face, the second data input could be tracing circles around the eyes and a smiling curve over the mouth. The captured second data is compared to a second standard at step 132 and a match is determined at step 134. If a match is not found in the comparison step 132, the authentication is rejected at step 126. However, if a match is found access is allowed at step 136.

The above example is a simple example of the linked two step authentication process. However, various alternatives to these steps and the devices used to undertake those steps are possible. For example, the data capture device 100 could be other devices than the Camera suggested in the above embodiment. The data capture device could be any device capable of measuring electro-magnetic waves to produce an image, for example infra-red cameras which are particularly used for measuring biometrics, UV cameras and the like. Equally, any other biometric measuring device could be used including fingerprint scanners, iris scanners, retina scanners and the like. Further example include using a microphone to capture sounds including voice recognition or recognising a sound (such as hitting metal on wood) or pitch inputs such as producing a specific note with a voice or musical instrument or some other way.

The object 110 can be any suitable object including a key card that includes on it a barcode or other similar data image that is readily recognised by the data capture device 100 and processor 102. Such a card could be an ID card but could also be a card with a single colour of a very specific shade or series of such cards.

In the conversion of the first data into an image set out above the captured data using a digital camera is converted into a photographic image. However, this conversion may also include the manipulation of this image to include other items which then form part of the interaction with the resultant image that leads to the capture of second data at step 130. Furthermore, the displayed image may be a moving image based on captured video images of the first data. In this instance, the comparison of first data to the first standard may be comparing a series of shapes, displayed in a predetermined order to a video camera and the second data may be receiving an input at a certain point during the replay of that video image. It should be noted that the video image created from the first image could be a 3D image, either single frame or video, and that 3D image could be created by 3D filming or photography or by creating an enhanced image with a 3D image element from 2D image or video captured as the first data. Furthermore, the interaction with the 3D image or video can then be a 3D interaction, for example using an input controller to draw an imaginary line around an object in the 3D space.

The display of the first data may include an augmented reality where the image or images captured in the first data are manipulated into an augmented reality to form part of an image or video image so produced.

The recording of second data may be using any input apparatus available to the user including manipulation of a cursor on screen using a mouse or keyboard input, tracing of an image on a touch screen device, manipulation using an accelerometer/gyroscope/orientation monitoring device. In the above example where the first data results in a video of an authentication process, the second step can be shaking of the device at a certain point in the replayed video of the first authentication step.

In another example, a user scans their hand using a biometric scanner which could be, for example, a mobile telecommunications device equipped with a digital camera. The processor in the device verifies the image as being a match with a standard and prepares the image from the camera for the next step. Using augmented reality, the system superimposes another image or group of images around the first image that the viewer can only see on the camera screen. The user is prompted to manipulate or interact with the composite image on the screen of the device. This interaction may be to move or rearrange items in the augmented reality image by moving their hand in front of the camera image to move virtual objects. The motions made in front of the camera are identified by the processor and tested against a predetermined set of movements. The authentication is therefore successfully completed.

In a further example, a user points a camera at a predetermined image which may be an encoded image or code such as used in PopCode™ which is available on business cards, t-shirts, tattoos or any other printed media. The scanning of the PopCode™ automatically triggers an augmented reality program to download and display a dynamic visual overlay on the original image. The user interacts in some predetermined way with the composite image, such as manipulating a part of the overlay with original image, for example dragging an overlaid object into a hole at a certain time during a song (or alternatively without the audio overlay). This interaction can be a manipulation on the screen or in front of a camera. The correct time-sensitive interaction will authenticate the user and allow that user to access a file, process, location, etc.

In another example, a mobile communications device is used as part of the security procedure for providing access to some other device or location. For example, the mobile device can be configured to communicate with the further security devices such as a building or vehicle locking device. As a result, to open a door of the building or vehicle the operator must have the correct mobile device which can communicate an encrypted code to the locking mechanism. The operator would then conduct further authentication steps such as those set out above including, as an example, taking a photograph of their face using the mobile device. This image is then sent to the locking device for authentication. To complete the authentication process the operator would then need to interact with the image and this interaction would again be sent to the locking device for final authentication. As a result, in order to gain entry the operator must have the correct mobile device, must use their own face and know the authentication step. This means that a very secure three layered authentication process is provided, but the time taken by the operator to gain access is not great.

Figure 9:
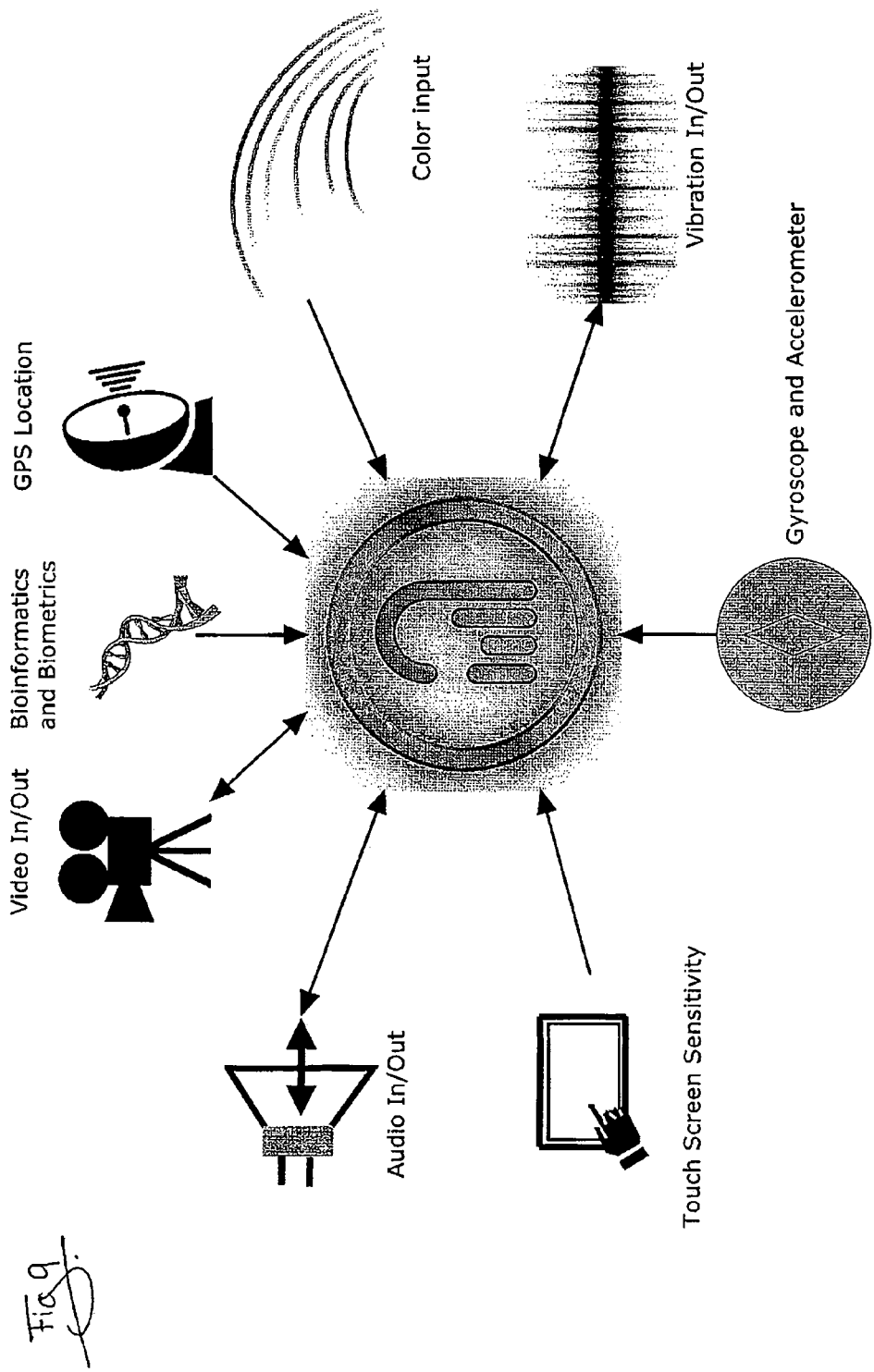
FIG. 9 is a schematic representation of the inputs that can be used in the implementations of the present invention.

Referring to FIG. 9, this Figure shows a schematic representation of some of the input forms that are used in the methods set out above.

It will be appreciated by persons skilled in the art that the above embodiments have been described by way of example only and not in any limitative sense, and that the various alterations and modifications are possible without departure from the scope of the invention as defined by the appended claims.

The invention claimed is:

1. An authentication method for entry control comprising the steps of:
   using at least one data capture device to capture first data relating to at least one object located adjacent said device;

testing said first data against at least one first standard to determine a first match;

upon successfully determining the first match, converting said first data into at least one first image and displaying said at least one first image on a display device;

recording second data relating to a user interaction with said first image;

testing said second data against at least one second standard to determine a second match; and allowing or denying access on the basis of said first and second matches.

2. A method according to claim 1, wherein said data capture device comprises a biometric scanner and said object is at least a part of a body.

3. A method according to claim 1, wherein said data capture device comprises an electromagnetic wave recording device.

4. A method according to claim 3, wherein said electromagnetic wave recording device comprises a camera.

5. A method according to claim 1, wherein said first data is converted into a first video image.

6. A method according to claim 1, wherein said second data comprises a second image traced on said display device.

7. A method according to claim 6, wherein said display device is a touch screen device and said second image is traced on said display device by touching said touch screen device.

8. A method according to claim 6, wherein said second image is traced on said display device using a pointing device.

9. A method according to claim 1, wherein said second data comprises a gesture made in front of a camera.

10. A method according to claim 1, wherein said data capture and testing takes place on a first device that transmits data including data identifying itself to a second device that allows access.

11. A computer including a processor and non-transient memory, the processor being configured to execute a program stored in the non-transient memory to provide entry control, comprising:

first computer code, executed by the processor, for using at least one data capture device to capture first data relating to at least one object located adjacent said device;

second computer code, executed by the processor, for testing said first data against at least one first standard to determine a first match;

third computer code, executed by the processor upon successfully determining the first match, for converting said first data into at least one first image and displaying said at least one image on a display device;

fourth computer code, executed by the processor, for recording second data relating to a user interaction with said image;

fifth computer code, executed by the processor, for testing said second data against at least one second standard to determine a second match; and sixth computer code, executed by the processor, for allowing or denying access on the basis of said first and second matches.

12. A computer according to claim 11, wherein said first computer code controls a biometric scanner and said object is at least a part of a body.

13. A computer according to claim 11, wherein said first computer code controls an electromagnetic wave recording device.

14. A computer according to claim 13, wherein said electromagnetic wave recording device comprises a camera.

15. A computer according to claim 11, wherein said third computer code converts said first data into a first video image.

16. A computer according to claim 11, wherein said second data comprises a second image traced on said display device.

17. A computer according to claim 16, wherein said display device is a touch screen device and said second image is traced on said display device by touching said touch screen device.

18. A computer according to claim 16, wherein said second image is traced on said display device using a pointing device.

19. A computer according to claim 11, wherein said second data comprises a gesture made in front of a camera.

20. A computer according to claim 11, wherein said data capture and testing takes place on a first device that transmits data including data identifying itself to a second device that allows access.

21. A computer product comprising a processor and non-transient memory, the processor being configured to execute a program stored in the non-transient memory and transmitted on a data carrier to provide entry control, said program containing computer program code according to claim 11.

* * * * *